(12) United States Patent
An et al.

(10) Patent No.: US 8,325,698 B2
(45) Date of Patent: Dec. 4, 2012

(54) GENERATING A PUBLIC LONG CODE MASK IN A MOBILE COMMUNICATIONS SYSTEM

(75) Inventors: Jong Hoe An, Kyonggi-do (KR); Chan Ho Kyung, Incheon (KR)

(73) Assignee: LG Electronics Inc., Seoul (KR)

( * ) Notice: Subject to any disclaimer, the term of this patent is extended or adjusted under 35 U.S.C. 154(b) by 629 days.

(21) Appl. No.: 12/488,436

(22) Filed: Jun. 19, 2009

(65) Prior Publication Data
US 2009/0257404 A1    Oct. 15, 2009

Related U.S. Application Data

(63) Continuation of application No. 10/836,184, filed on Apr. 29, 2004, now Pat. No. 7,561,556.

(60) Provisional application No. 60/527,248, filed on Dec. 5, 2003.

(30) Foreign Application Priority Data

| May 1, 2003 | (KR) | ................................. 2003-28042 |
| May 3, 2003 | (KR) | ................................. 2003-28418 |
| Aug. 11, 2003 | (KR) | ................................. 2003-55373 |

(51) Int. Cl.
*H04B 7/216* (2006.01)

(52) U.S. Cl. ...................................................... 370/342

(58) Field of Classification Search ........................ None
See application file for complete search history.

(56) References Cited

U.S. PATENT DOCUMENTS

| 5,887,252 | A | 3/1999 | Noneman |
| 6,091,717 | A | 7/2000 | Honkasalo et al. |
| 6,330,333 | B1 * | 12/2001 | Mizikovsky et al. ......... 380/207 |
| 6,519,239 | B1 | 2/2003 | Panchal et al. |
| 6,542,538 | B2 * | 4/2003 | Fischel et al. ................. 375/224 |
| 6,643,280 | B1 | 11/2003 | Li et al. |
| 6,674,739 | B1 * | 1/2004 | Lee et al. ...................... 370/342 |
| 6,735,185 | B1 * | 5/2004 | Noneman ..................... 370/335 |
| 6,857,075 | B2 * | 2/2005 | Patel ............................. 713/171 |
| 2002/0071558 | A1 * | 6/2002 | Patel ............................. 380/270 |
| 2003/0002525 | A1 | 1/2003 | Grilli et al. |

(Continued)

FOREIGN PATENT DOCUMENTS

KR    1999-0083643    11/1999

(Continued)

OTHER PUBLICATIONS

3rd Generation Partnership Project 2 (3GPP2); "Hard Handoff For New PLCM_32—Rev. 2"; 3GPP2 TSG-A; A30-20020909-XXX; Sep. 9, 2002.

(Continued)

*Primary Examiner* — Hassan Phillips
*Assistant Examiner* — Prenell Jones
(74) *Attorney, Agent, or Firm* — Lee, Hong, Degerman, Kang & Waimey

(57) ABSTRACT

A method of generating a public long code mask (PLCM) in a mobile station in a wireless mobile communication network is provided. The method comprises receiving a message in the mobile station from a base station when the mobile terminal is handed off, the message comprising a first field including a first value, a second field including a second value, and a third field including least significant bits of the PLCM; and generating the PLCM using the least significant bits included in the third field.

15 Claims, 9 Drawing Sheets

U.S. PATENT DOCUMENTS

| | | | |
|---|---|---|---|
| 2004/0202127 A1* | 10/2004 | Loh et al. | 370/331 |
| 2004/0213280 A1 | 10/2004 | Patel | |
| 2005/0037778 A1* | 2/2005 | Patel | 455/456.3 |
| 2005/0090276 A1 | 4/2005 | Rajkotia | |
| 2007/0025350 A1* | 2/2007 | Kyung et al. | 370/390 |

FOREIGN PATENT DOCUMENTS

| | | |
|---|---|---|
| KR | 1020020065524 | 8/2002 |
| WO | 9949597 | 9/1999 |
| WO | 0152567 | 7/2001 |

OTHER PUBLICATIONS

3rd Generation Partnership Project 2 3GPP2; "Multi-carrier Specification For Spread Spectrum Systems On GSM MAP (MC-MAP) (Lower Layers Air Interface)"; 3GPP2 C.S0008-0; Jun. 9, 2000.

* cited by examiner

FIG. 4

| 41 40 | 39 ... 37 | 36 ... 0 |
|---|---|---|
| 11 | Code channel index(i) | PLCM_37 |

Code channel index(i)
  '000': Reverse fundamental channel
  '001'~'111': Reverse supplemental code channel, (i = 1,...,7)

FIG. 5

| 41 40 | 39 ... 37 | 36 ... 0 |
|---|---|---|
| 11 | 000 | PLCM_37 |

FIG. 6

| 36 ~ 32 | 31 ... 0 |
|---|---|
| M36 ~ M32 | M31 ~ M0 |

PLCM_TYPE='0000'=>M36~M32='11000', M31~M0=Permutated ESN
PLCM_TYPE='0001'=>M36~M32='11011', M31~M0=PLCM_32(ECAM)

USE_ESN_BASED_PLCM='0'=>M36~M32='11011',M31~M0=PLCM_32
                                                                          (SCM OR UHDM)
USE_ESN_BASED_PLCM='1'=>M36~M32='11000',M31~M0=Permutated ESN

| Field | Length |
|---|---|
| [...] | |
| USE_ESN_BASED_PLCM | 1 |
| PLCM_32 | 0 or 32 |

FIG. 9

| Field | Length |
|---|---|
| [...] | |
| USE_ESN_BASED_PLCM | 1 |
| PLCM_INCL | 0 or 1 |
| PLCM_32 | 0 or 32 |

FIG. 10

| 41 40 | 39 ~ 0 |
|---|---|
| 1 0 | PLCM_40 |

FIG. 11

| 41 40 | 39 | 38 ~ 0 |
|---|---|---|
| 1 0 | 1 | PLCM_39 |

FIG. 12

| 41 40 | 39~37 | 36~32 | 31 ~ 0 |
|---|---|---|---|
| 1 1 | 0 0 0 | 1 1 0 0 0 | Permuted_ESN |

FIG. 13

| Field | Length |
|---|---|
| [...] | |
| USE_ESN_BASED_PLCM | 1 |
| PLCM_INCL | 0 or 1 |
| PLCM_39 | 0 or 39 |

GENERATING A PUBLIC LONG CODE MASK IN A MOBILE COMMUNICATIONS SYSTEM

CROSS-REFERENCE TO RELATED APPLICATIONS

This application is a continuation of U.S. application Ser. No. 10/836,184, filed on Apr. 29, 2004, now U.S. Pat. No. 7,561,556, which claims the benefit of earlier filing date and right of priority to Korean Patent Application Numbers 10-2003-28042, 10-2003-28418, and 10-2003-55373 filed on May 1, 2003, May 3, 2003, and Aug. 11, 2003, respectively, and also claims the benefit of Provisional Application No. 60/527,248, filed on Dec. 5, 2003, the content of which are all hereby incorporated by reference herein in their entirety.

RELATED FIELD

The present invention relates to a system and method of generating a public long code mask (PLCM) in a mobile communications system.

BACKGROUND

In the world of cellular telecommunications, those skilled in the art often use the terms 1G, 2G, and 3G. The terms refer to the generation of the cellular technology used. 1G refers to the first generation, 2G to the second generation, and 3G to the third generation.

1G is used to refer to the analog phone system, known as an AMPS (Advanced Mobile Phone Service) phone system. 2G is commonly used to refer to the digital cellular systems that are prevalent throughout the world, and include CDMAOne, Global System for Mobile communications (GSM), and Time Division Multiple Access (TDMA). 2G systems can support a greater number of users in a dense area than can 1G systems.

3G is commonly used to refer to the digital cellular systems currently being developed. Recently, third-generation (3G) CDMA communication systems have been proposed including proposals, such as CDMA2000 and W-CDMA. These 3G communication systems are conceptually similar to each other with some significant differences.

A CDMA2000 system is a third-generation (3G) wideband, spread spectrum radio interface system that uses the enhanced service potential of CDMA technology to facilitate data capabilities, such as Internet and intranet access, multimedia applications, high-speed business transactions, and telemetry. The focus of CDMA2000, as is that of other third-generation systems, is on network economy and radio transmission design to overcome the limitations of a finite amount of radio spectrum availability.

Referring to FIG. 1, a subscriber uses a Mobile Station to access network services. The Mobile Station may be a portable communications unit, such as a hand-held cellular phone, a communication unit installed in a vehicle, or even a fixed-location communications unit.

The electromagnetic waves from the Mobile Station are transmitted by the Base Transceiver System (BTS) also known as node B. The BTS consists of radio devices such as antennas and equipment for transmitting radio waves. The Base Station Controller (BSC) receives the transmissions from one or more BTS's. The BSC provides control and management of the radio transmissions from each BTS by exchanging messages with the BTS and the Mobile Switching Center (MSC) or Internal IP Network. The BTS's and BSC may be part of the Base Station (BS).

FIG. 2 illustrates a data link protocol architecture layer for a wireless network. The upper layer contains three basis services; voice services 62, data services 61 and signaling 70. Voice services 62 include PSTN access, mobile-to-mobile voice services, and Internet telephony. Data services 61 are services that deliver any form of data on behalf of a mobile end user and include packet data applications (e.g., IP service), circuit data applications (e.g., asynchronous fax and B-ISDN emulation services), and SMS. Signaling 70 controls all aspects of mobile operation.

In the CDMA2000 communication system, a long code is used in forward channel for ciphering the forward channel and determining the location of a power control bit. In the reverse channel, the long code is used as an element for identifying each terminal and reducing interference among subscriber terminals.

A long code is, typically, constructed of 42 bits. FIG. 3 is a block diagram of a related art method for generating a long code and transmitting a transmission signal using the long code based on a long code mask. As shown, a long code (a long code sequence) is generated based on a 42-bit long code mask. The generated long code undergoes modulo-2 inner product of a transmission signal X.

The long code mask may be separately generated for each channel. The long code mask is used in common channels based on the above method. In traffic channels, the long code mask is generally referred to as a public long code mask or PLCM. When a voice signal is ciphered in the traffic channels, it is referred to as a private long code mask. A long code is used for scrambling and spreading as provided in further detail below.

A long code is a sequence used for scrambling on the Forward CDMA channel and spreading on the reverse CDMA channel. The long code uniquely identifies a mobile station on both the reverse traffic channel and the forward traffic channel. The long code provides limited privacy. The long code also separates multiple access channels and enhanced access channels on the same CDMA Channel. A long code mask is a 42-bit binary number that creates the unique identity of the long code, for example. A private long code is the long code characterized by the private long code mask. A private long code mask is the long code mask used to form the private long code. A public long code is the long code characterized by the PLCM. A PLCM is the long code mask used to form the public long code. The mask can contain a permutation of the mobile station's ESN, or the particular mask specified by the base station. The mask also includes the channel number information when used for supplemental code channel.

The PLCM used in the traffic channel is shown in FIG. 4 and FIG. 5. FIG. 4 is a diagram of a PLCM for a reverse fundamental channel, and a reverse supplemental code channel, wherein radio configuration (RC) is 1 or 2.

FIG. 5 is a diagram of a PLCM for a reverse fundamental channel, a reverse supplemental channel, a reverse dedicated control channel, a forward fundamental channel, a forward supplemental code channel, a forward supplemental channel, a forward dedicated control channel, or a forward packet data channel, wherein radio configuration (RC) is, for example, 3, 4, 5, and 6.

Referring to FIG. 4 and FIG. 5, the PLCM includes PLCM_37 (e.g., positions M36~M0) constructed with least significant 37 bits. The PLCM_37 can be divided into first significant segment M36~M32, and second significant segment M31~M0. A code channel index i, as shown in FIG. 4, indicates three bits M39~M37 in front of the first least significant bits M36~M32. The value of '000' for the code channel index i indicates a reverse fundamental channel. Values '001' to '111' indicate a reverse supplemental code channel, where i=1~7, for example.

A base station can inform a mobile terminal how the least significant 37 bits PLCM_37, (i.e., the first least significant 5 bits M36~M32 and the second least significant 32 bits M31~M0), of the PLCM are generated via an extended channel assignment message (ECAM).

FIG. 6 is a diagram of a method of generating the least significant 37 bits PLCM_37 of the PLCM according to a PLCM type PLCM_TYPE defined in the ECAM.

The PLCM_TYPE is 4 bits. If the PLCM_TYPE is received from the base station through the ECAM is '0000', the terminal sets the first least significant 5 bits (M36~M32) to '11000' and sets the second least significant 32 bits (M31~M0) by using the following equations 1 and 2 to calculate a permuted ESN.

$$ESN=\{E31,E30,E29,\ldots,E2,E1,E0\} \quad \text{[Equation (1)]}$$

$$M31\sim M0=\{E0,E31,E22,E13,E4,E26,E17,E8,E30,\\E21,E12,E3,E25,E16,E7,E29,E20,E11,E2,E24,\\E15,E6,E28,E19,E10,E1,E23,E14,E5,E27,E18,\\E9\} \quad \text{[Equation (2)]}$$

The ESN is an identifier assigned to the terminal in the communication system, and is used for call processing. It may be needed that the least significant 37 bits (M36~M0) of the PLCM be changed during hand-off or when the mobile terminal is communicating with the base station. As such, the present invention is needed in two scenarios. First, during handoff and second when the method of generating PLCM needs to be changed when base station and mobile terminal are in communication.

In some cases, the terminal generates the least significant 37 bits (M36~M0) using the PLCM_TYPE and the least significant 32 bits PLCM_32 provided by the base station. Later, when the mobile terminal moves to a new cell, the base station in the new cell may require the mobile terminal to generate the least significant 37 bits (M36~M0) of the PLCM using the ESN While the above method is supported in the related art handover systems and methods, the reverse is not. That is, a new cell may require the mobile terminal to use a long code mask generated based on a value (PLCM_32) provided by the base station, when the old cell required the mobile terminal to use the ESN.

Unfortunately, the current systems and methods do not support a transition from a base station supporting the ESN based long code mask to a base station supporting a base station assigned long code mask scheme. Particularly, a problem arises when a base station assigned long code mask scheme is used by a mobile station when the mobile station enters a communication network where a base station assigned long code mask scheme should not be used. A method and system is needed to overcome the mentioned problem.

SUMMARY

In accordance with one embodiment, a method of generating a PLCM in a mobile communications network and transmitting data using the PLCM is provided. The method comprises assigning a first PLCM type, when the PLCM for the mobile terminal is assigned by the mobile communications network; and assigning a second PLCM type, when the PLCM for the mobile terminal is determined based on an electronic serial number (ESN) associated with the mobile terminal; wherein when the mobile terminal travels from a first network segment supporting a first PLCM assignment scheme to a second network segment supporting a second PLCM assignment scheme, a first value is transmitted to the mobile terminal wherein based on the first value the mobile terminal determines the PLCM.

The first value is included in a first field of a data structure transmitted to the mobile terminal. The data structure comprises a second field comprising a second value indicating whether the first field is included in the data structure. In another embodiment, the data structure comprises a second field comprising a second value indicating whether the first value is included in the first field.

A second value is included in a second field of a data structure to the mobile terminal, the second value indicating whether the first value is transmitted to the mobile terminal. The first value is included in a first field of the data structure, when the second value is equal to a first logic level (1).

In another embodiment, the first value is not included in the data structure, when the second value is equal to a second logic level. In one embodiment, when the first PLCM type is included in the third field, most significant bits of the PLCM are set to a first significant value. When the second PLCM type is included in the third field, most significant bits of the PLCM are set to a second significant value.

In yet another embodiment, a method of assigning a PLCM to a mobile terminal in a mobile communications network, wherein the PLCM comprises a first significant segment and a second significant segment is provided. The method comprises transmitting a message to the mobile terminal, when the mobile terminal is handed off from a first base station to a second base station; and including in the message PLCM assignment data to indicate whether the second base station supports a PLCM assignment method compatible with that of the first base station; wherein when the second base station supports a first PLCM assignment method the PLCM assignment data comprises a first value so that the first value can be included in the second significant segment of the PLCM by the mobile terminal, instead of a second value used by the mobile terminal prior to the hand off.

The first value is assigned by the base station, after hand off is initiated. The second value is determined based on an electronic serial number (ESN) associated with the mobile terminal, in one embodiment. The second value is determined from a permutated version of an electronic serial number (ESN) associated with the mobile terminal.

In some embodiments, the first value is stored in the mobile terminal memory. The second value is used again, when the mobile terminal is handed off to a third base station that supports a second PLCM assignment method. The second value is also included in the second significant segment of PLCM, instead of the first value, wherein the third base station does not assign the second value.

In one embodiment, the first value from the mobile terminal memory, in response to receiving a message from a fourth base station indicating that the fourth base station supports the first PLCM assignment method, when the mobile terminal is handed off to the fourth base station. The first value is included in the second significant segment of the PLCM, instead of the second value.

The first significant segment of the PLCM comprises a first significant value, when the second significant segment of the PLCM comprises the first value. And, the first significant segment of the PLCM comprises a second significant value, when the second significant segment of the PLCM comprises the second value.

In one embodiment, a first PLCM type is assigned, when the first significant segment of the PLCM comprises the first significant value. And, a second PLCM type is assigned, when the when the first significant segment of the PLCM comprises the second significant value.

The first value and the first PLCM type are included in the message transmitted from the base station, upon hand off, wherein an indicator is included in the message transmitted from the base station to indicate that the first value is included in the message.

In accordance with another embodiment, a system for assigning a PLCM to a mobile terminal handed off from a first base station to a second base station is provided. A message is transmitted from the second base station to the mobile terminal comprising PLCM assignment data comprising a first value indicating a first type of PLCM assignment scheme supported by the second base station.

The PLCM assignment data further comprises a second value, wherein the mobile terminal utilizes the second value (PLCM_32) to construct the PLCM. The PLCM assignment data further comprises a third value for indicating whether a second value is transmitted to the mobile terminal. In some embodiments, the PLCM comprises a first significant segment and a second significant segment, wherein the first significant segment comprises a first significant value and the second significant segment comprises the second value.

In accordance with one embodiment, a method of generating a public long code mask (PLCM) in a mobile station in a wireless mobile communication network is provided. The method comprises receiving a message in the mobile station from a base station when the mobile terminal is handed off, the message comprising a first field including a first value, a second field including a second value, and a third field including least significant bits of the PLCM; and generating the PLCM using the least significant bits included in the third field, wherein the first value indicates that the message includes the second field and the second value indicates that the message includes the third field.

Depending on implementation, the first field may be one bit in length and the second field is four bits in length. The first field may be a PLCM-type-included indicator and the second field may be a PLCM-type indicator; and the third field may be 39 bits in length. In some embodiments, the first value is '1' and the second value is '0001'; and the message is a universal handoff direction message (UHDM) or a service connection message (SCM).

In one embodiment, a method of generating a public long code mask (PLCM) in a mobile station in a wireless mobile communication network is provide, the method comprises receiving a message in the mobile station from a base station when the mobile terminal is handed off, reading a first field of the message; reading a second field of the message if the first field comprises a first value; and reading a third field of the message if the second field comprises a second value, wherein the third field includes least significant bits of the PLCM; and generating the PLCM using the least significant bits of the PLCM.

In one embodiment, a method of generating a public long code mask (PLCM) in a mobile station in a wireless mobile communication network is provided. The method comprises receiving a message in the mobile station from a base station when the mobile terminal is handed off, reading a first field of the message; setting a first parameter of the mobile station to a value of a second field of the message if the first field comprises a first value; setting a second parameter of the mobile station to a value of a third field of the message if the second field comprises a second value; and generating the PLCM using the second parameter.

In one embodiment, the method of providing a public long code mask (PLCM) to a mobile station in a wireless mobile communication network is provided. The method comprises transmitting a message to the mobile station from a base station, the message comprising a first field including a first value, a second field including a second value, and a third field including least significant bits of the PLCM, wherein the least significant bits included in the third field are used to generate the PLCM, wherein the first value indicates that the message includes the second field and the second value indicates that the message includes the third field.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principle of the invention.

FIG. 4 is a diagram of a PLCM for a reverse fundamental channel and a reverse supplemental code channel wherein radio configuration (RC) is 1 or 2.

FIG. 5 is a diagram of a PLCM for a reverse fundamental channel, a reverse supplemental channel, a reverse dedicated control channel, a forward fundamental channel, a forward supplemental code channel, a forward supplemental channel, a forward dedicated control channel, and a forward packet data channel wherein radio configuration (RC) is 3, 4, 5, and 6.

FIG. 6 is a diagram of a method of generating least significant 37 bits PLCM_37 of PLCM, according to a PLCM type.

FIG. 7 is a diagram of a method of generating least significant 37 bits (M36~M0) of a PLCM according to a field USE_ESN_BASED_PLCM and a field PLCM_32 added to a service connect message (SCM) or universal handoff direction message (UHDM) according to preferred embodiments.

FIGS. 8 and 9 illustrate various formats of a service connect message (SCM) or universal handoff direction message (UHDM), according to preferred embodiments.

FIG. 10 is an exemplary diagram of a PLCM format in accordance with one embodiment, where a PLCM type is '0001'.

FIG. 11 is an exemplary diagram of a PLCM format in accordance with one embodiment, where a field USE_ESN_BASED_PLCM indicating a use state of a second type PLCM is '0'.

FIG. 12 is an exemplary diagram of a PLCM format in accordance with one embodiment, where a field USE_ESN_BASED_PLCM indicating a use state of a second type PLCM is '1'.

FIG. 13 is an exemplary diagram of fields that will be added to a service connect message (SCM) or universal handoff direction message (UHDM) according to the one embodiment of the invention.

Features, elements, and aspects of the invention that are referenced by the same numerals in different figures represent the same, equivalent, or similar features, elements, or aspects in accordance with one or more embodiments of the system.

Figure 1:
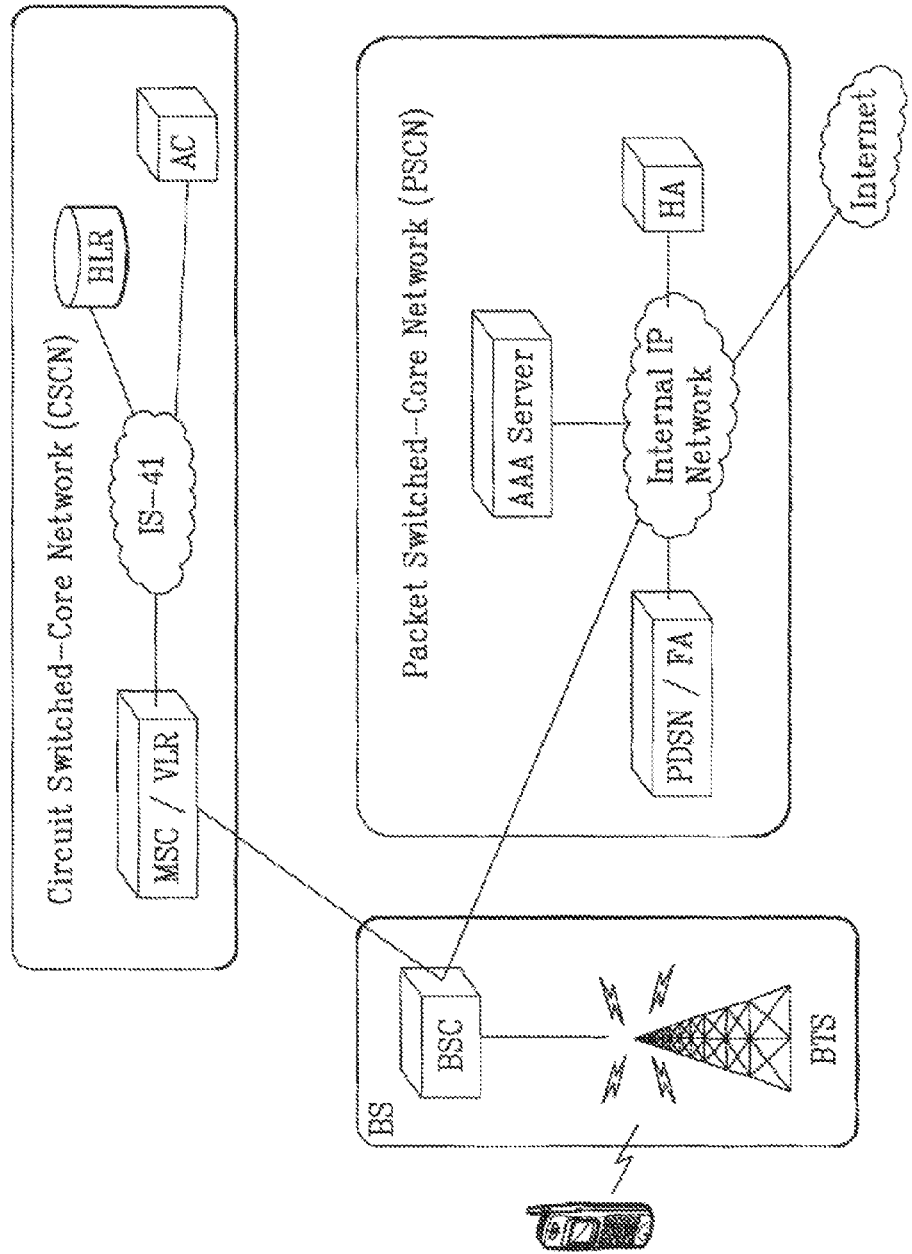
FIG. 1 illustrates a wireless communication network architecture.
Figure 2:
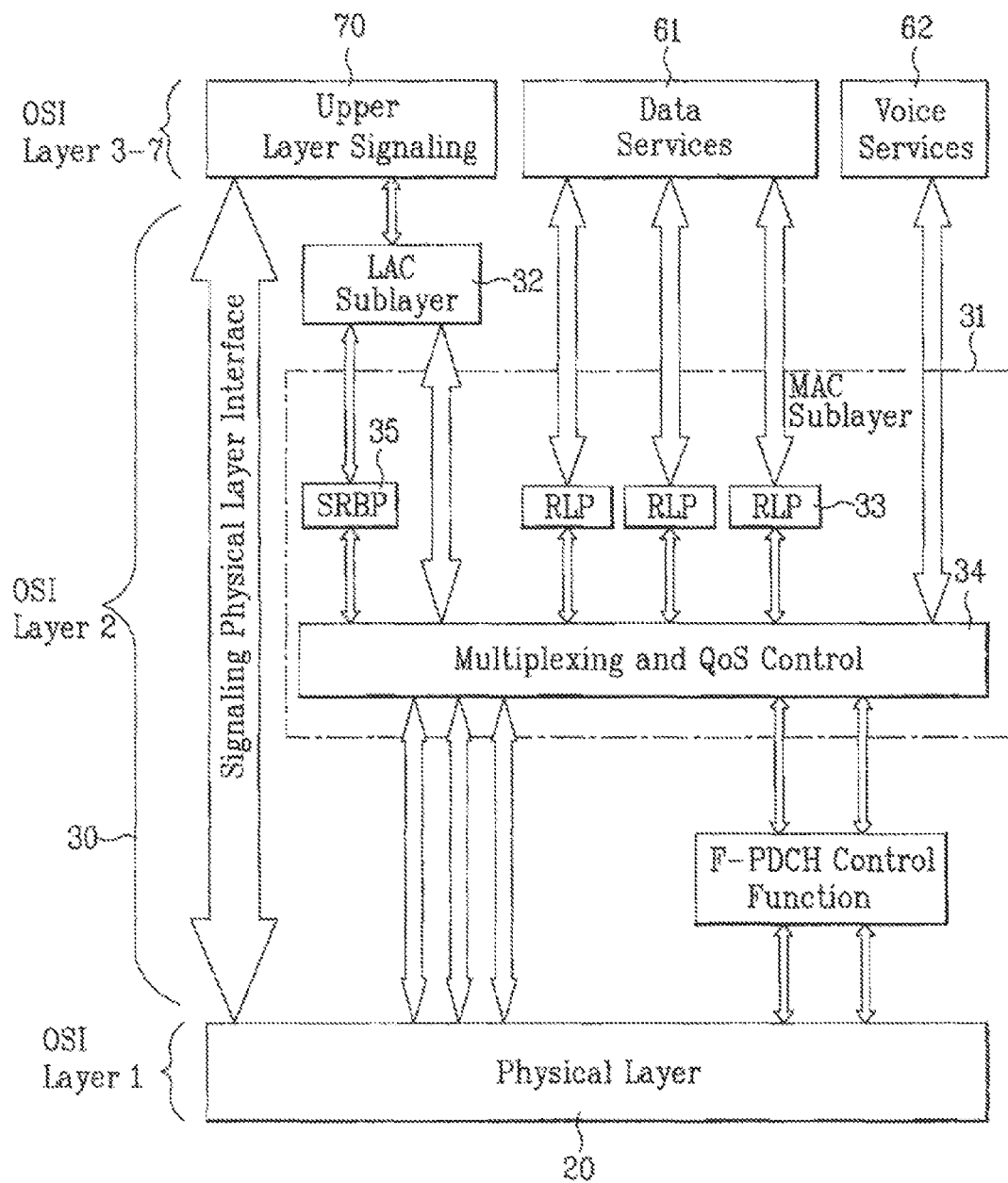
FIG. 2 illustrates a data link protocol architecture layer for a wireless network.
Figure 3:
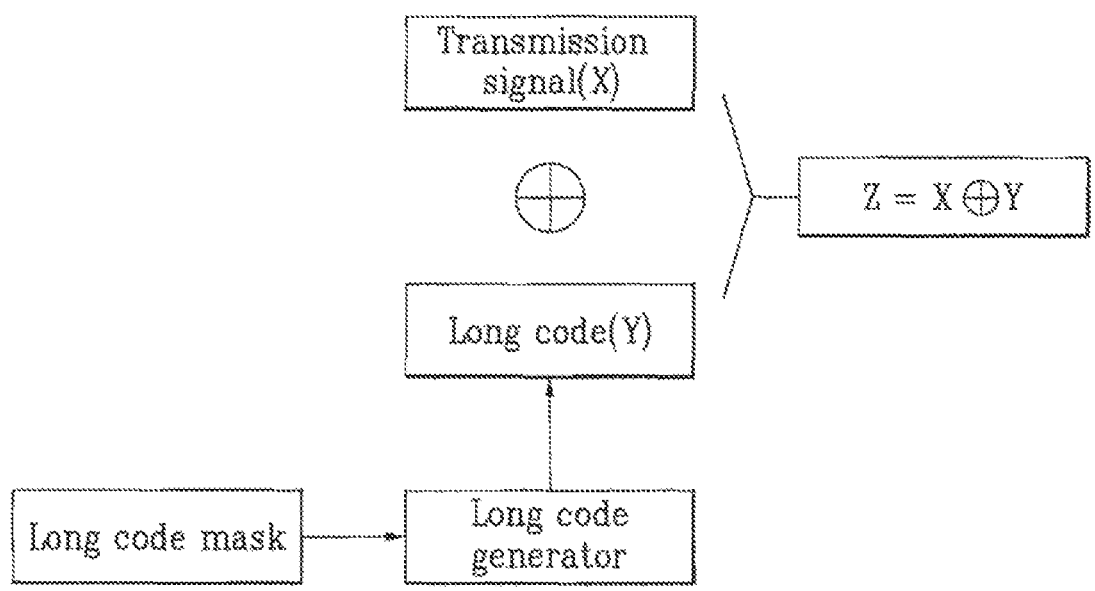
FIG. 3 is a block diagram illustrating a method of generating a long code in accordance with the related art.

DETAILED DESCRIPTION OF EXEMPLARY
EMBODIMENTS

To aid describing the present invention, certain exemplary parameter names, values, lengths and other attributes are being used to describe the channels, messages and fix or variable identifiers communicated between mobile and base stations. It should be noted that such parameter names are for illustration purposes only, and that other names may be used to describe the same or similar function.

In accordance with one embodiment, a method of generating a PLCM based on ESN is referred to as PLCM_37_ESN. Further, a method of generating least significant 37 bits of a PLCM based on least significant 32 bits, for example, provided to the mobile terminal by a base station (BS) is referred to as PLCM_37_BS.

One or more embodiments of the invention are described, by way of example, using the above-defined terms as applicable to a PLCM comprising of 37 bits. It is noteworthy that the above exemplary embodiments shall not be construed to limit the scope of the application to the particular embodiments disclosed. Alternative embodiments may be implemented based on different PLCM structures. For example, in one embodiment the PLCM may comprise 39 bits and be thus defined as PLCM_39, for example.

Referring to FIGS. 5 and 6, when a base station assigns a traffic channel to a mobile terminal, the base station transmits a public long code type and, for example, a 32-bit value (e.g., PLCM_32) over an ECAM to inform the mobile terminal how to generate the least significant 37 bits (e.g., M36~M32 and M31~M0). The base station provides the PLCM_32 over the ECAM, when the PLCM type or PLCM_TYPE is 1'. As such, the base station assigns the 32-bit value and the mobile terminal uses it to generate PLCM.

In one embodiment, when a PLCM type PLCM_TYPE is received from a base station through the ECAM, it is determined if the PLCM_TYPE value is '1'. If so, the mobile terminal uses the PLCM_32 value forwarded by the base station to generate, for example, the least significant 32 bits M31~M0 of the mobile terminal's PLCM. If the PLCM type PLCM_TYPE is '0', the terminal uses a permutated version of the mobile terminal's ESN to generate the least significant 37 bits (e.g., M36~M0) of the PLCM, for example.

In some embodiments, a mobile terminal may travel from a first cell to a second cell, where the first cell uses a first PLCM assignment method (e.g., base station assigned PLCM_32), and the second cell uses a second PLCM assignment method (e.g., permutated ESN). Depending on implementation values such as '0' or '1' may be used to indicate the PLCM assignment method in a cell. This value is transmitted in a data structure having a plurality of fields. The data structure is transmitted from the base station to the mobile terminal to notify the mobile terminal of the change in method of PLCM generation.

The data structure may be transmitted via a service connect message (SCM) or universal handoff direction message (UHDM). A field in the data structure, such as PLCM_TYPE or USE_ESN_BASED_PLCM may be set to a first value, such as for example '1' (if USE_ESN_BASED_PLCM='0') to indicate that a base station assigned value (e.g., PLCM_32, PLCM_37, PLCM_39) is to be used to set the long code mask for the mobile terminal. If the field PLCM_TYPE is set to a zero value, then the long code mask is calculated based on a permuted ESN, for example.

If the permuted ESN would result in a long code mask value that can collide with another mobile terminal in a cell, then the base station will assign a value, such as PLCM_32, to the terminal, so that the terminal can generate the least significant 37 bits (M36~M0) of the PLCM, for example.

In the preferred embodiment, based on the value of the field USE_ESN_BASED_PLCM, the base station may notify the mobile station to switch the method of generating the PLCM based on the ESN to the method based on value assigned by the base station and the base station may switch itself. The service connect message (SCM) or universal handoff direction message (UHDM) can be used to transfer the field value from the base station to the mobile terminal.

Figures 7, 8:
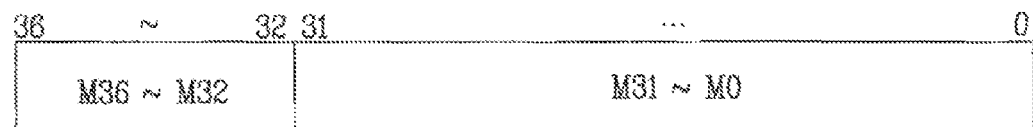

The value of the USE_ESN_BASED_PLCM field is set to '1', for example, when the permutated ESN is to be used. Referring to FIG. 8, for example, the base station sets the field USE_ESN_BASED_PLCM of the service connect message (SCM) or universal handoff direction message (UHDM), to '0' to inform the terminal that the method of generating the PLCM should be switched from PLCM_32_ESN to the PLCM_32_BS method, for example.

Referring to FIG. 9, the base station in addition to a field PLCM_32 also adds a field PLCM_INCL. PLCM_INCL can be also in the ECAM, in accordance with the preferred embodiment of the invention. PLCM_INCL can be set to inform the mobile terminal whether the new field PLCM_39 is included in the message forwarded from the base station. The message may be, for example, the service connect message (SCM) or universal handoff direction message (UHDM), EACM or any other message transmitted from the base station or other network component to the mobile terminal, over the traffic, control or overhead channels.

Preferably, when the value of the field PLCM_INCL is set to '0', the new field PLCM_32 is omitted. If the value of the field PLCM_INCL is set to '1', for example, the new field PLCM_32 is included in the message. Therefore, PLCM_INCL preferably comprises 1 bit.

Referring to FIG. 7, in one embodiment, the least significant 37 bits (M36~M0) of the PLCM may be divided into first least significant 5 bits (M36~M32) and second least significant 32 bits (M31~M0). If the field USE_ESN_BASED_PLCM in the service connect message (SCM) or universal handoff direction message (UHDM) or ECAM is set to '0', the terminal sets the first least significant 5 bits (M36~M32) of the PLCM to '11011' and sets the second least significant 32 bits (M31~M0) equal to the least significant 32 bits PLCM_32.

If the field USE_ESN_BASED_PLCM in a message such as the service connect message (SCM) or universal handoff direction message (UHDM), ECAM is set to '1', for example, the terminal sets the first least significant 5 bits (M36~M32) to '11000' and generates the second least significant 32 bits (M31~M0) based on the permutated ESN.

Referring back to FIG. 9, in accordance with one aspect of the invention, the field PLCM_39 is added to a message forwarded from the base station to the mobile terminal, if the value of the field USE_ESN_BASED_PLCM is set to '0' and the value of the field PLCM_INCL is '1'. The field PLCM_39 is omitted, however, if the value of the field USE_ESN_BASED_PLCM is set to '1' or the field PLCM_INCL is 0'.

Accordingly, the present invention adds the new fields PLCM_INCL and one of PLCM_32, PLCM_37 or PLCM_39 to a message (e.g., SCM or UHDM or ECAM, when a BS assigned PLCM scheme is required. This method allows for the mobile terminal to construct a PLCM based on a value provided by the new base station, when the terminal is handed over from a base station that supports an ESN PLCM assignment scheme.

Accordingly, in an exemplary embodiment, in the SCM, USE_ESN_BASED_PLCM is removed and a one-bit PLCM_TYPE_INCL is added instead. When PLCM_TYPE_INCL is set to '1', a 4-bit PLCM_TYPE is included. PLCM_TYPE_INCL is set to '0' when there is no change in the PLCM_TYPE during the service negotiation. When PLCM_TYPE is set to '0001', a 39-bit PLCM_39 is included for example.

In other embodiments, when a PLCM_TYPE_INCLr equals '1', the mobile station sets a PLCM_TYPEs to a PLCM_TYPEr. When a PLCM_TYPEr is included and equals '0001', the mobile station set a PLCM_39s to a PLCM_39r as provided in the following exemplary service connect message structure:

| | |
|---|---|
| PLCM_TYPE_INCL | 1 |
| PLCM_TYPE | 0 or 4 |
| PLCM_39 | 0 or 39 |

In this exemplary embodiment, PLCM_TYPE_INCL is the PLCM type included indicator. The base station sets this field to '1' if the base station includes the PLCM_TYPE in the message; otherwise, the base station sets this field to '0'.

PLCM_TYPE is the PLCM type indicator. If PLCM_TYPE_INCL is set to '0', the base station omits this field; otherwise, the base station includes this field and sets this field to a corresponding PLCM type as follows.

For example, PLCM_TYPE '0010' is not used when the mobile station is not in its home country (i.e., the MCC of the mobile station is different from the MCC of this base station). PLCM_TYPE '0011' is not used when the mobile station is not in its home network (i.e., the MCC or MNC of the mobile station is different from the MCC or MNC of this base station).

In one embodiment, PLCM_39 represents the 39 least significant bits of the PLCM. If PLCM_TYPE is not set to '0001', the base station omits this field; otherwise, the base station includes this field and sets it to the 39 least significant bits of the PLCM, for example.

According to the above and referring to FIG. 10, when the PLCM type (PLCM_TYPE) is '0001', a format of a PLCM comprises PLCM_40 constructed with 40 bits, for example. The mobile terminal sets the most significant bits (M39) among the PLCM_40 (or M39~M0) to '1' and the 39 bits (M38~M0) lower than the most significant bit (M39) to 39 bits (PLCM_39) allocated by a base station.

FIG. 11 is an exemplary diagram of a PLCM format in accordance with one embodiment, where a field (USE_ESN_BASED_PLCM) indicating a use state of a second type PLCM (USE_ESN_BASED_PLCM) is '0'. Referring to FIG. 11, for example, '10' is used as most significant two bits M41 and M40, '1' is used as a bit M39 next to the most significant two bits M41 and M40, and '39 bits PLCM_39' assigned by the base station are used as lower 39 bits M38 to M0, respectively.

FIG. 12 is an exemplary diagram of a PLCM format in accordance with one embodiment, where a field (USE_ESN_BASED_PLCM) indicating a use state of a second type PLCM (USE_ESN_BASED_PLCM) is '1'. Referring to FIG. 12, for example, '11' is used as most significant two bits M41 and M40, '000' is used as three bits M39 to M37 next to the most significant two bits M41 and M40, '11000' is used as five bits M36 to M32 next to the three bits M39 and M37, and a permutated electronic serial number Permuted_ESN is used as the rest lower 32 bits M31 to M0.

FIG. 13 is an exemplary diagram of fields that will be added to a service connect message (SCM) or universal handoff direction message (UHDM) according to the one embodiment of the invention. Referring to FIG. 13, for example, USE_ESN_BASED_PLCM is a field indicating a use state of PLCM using the ESN (or type 0), and its length is one bit. In one embodiment, the PLCM_39 is a field including the 39 bits assigned by the base station, and has a length of 0 or 39 bits. PLCM_INCL is a field indicating whether the field PLCM_39 exists in the SCM (service connect message) or UHDM (universal handoff direction message).

In another embodiment, a third field PLCM_INCL is added to the SCM or UHDM, if a value of the use state field of USE_ESN_BASED_PLCM is '0', for example. In one embodiment, the third field is omitted if the value of the use state field of USE_ESN_BASED_PLCM is '1', for example. Moreover, a second field PLCM_39 is added to the SCM or UHDM, if the third field PLCM_INCL is added to the SCM. This is because the value of the use state field of USE_ESN_BASED_PLCM is '0', if values of UHDM and the third field PLCM_INCL are '1'. In one embodiment, if a value of the first field USE_ESN_BASED_PLCM indicating a use state of the USE_ESN_BASED_PLCM is '1' or if the value of the third field PLCM_INCL is '0', the second field PLCM_39 is not included in the SCM or UHDM).

Accordingly, in one embodiment, if the value of the first field USE_ESN_BASED_PLCM indicating the use state of the USE_ESN_BASED_PLCM is '0', the second and third fields PLCM_39 and PLCM_INCL are added to the SCM or UHDM. Therefore, in accordance with the changed situation of the system, the present invention supports a method for the mobile terminal to change the PLCM generated by the type 0 into the method of generating the PLCM using the PLCM_39 assigned by the base station.

Figure 14:
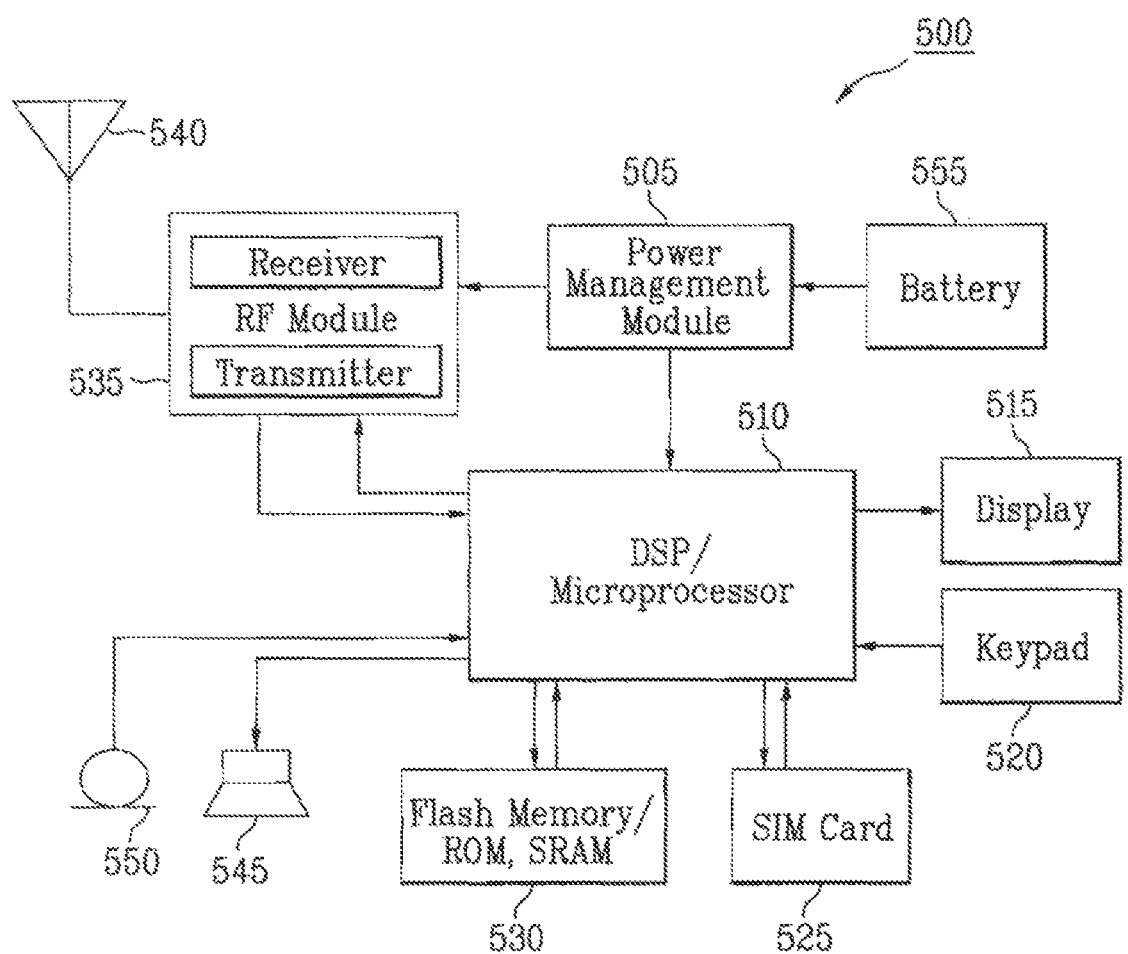
FIG. 14 illustrates the various components of an exemplary mobile station or mobile terminal 500, in accordance with the preferred embodiment of the invention.

Referring to FIG. 14, the mobile station 500 comprises a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF section 535, to initiate communication, for example, transmit radio signals comprising voice communication data. The RF section 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example.

It will be apparent to one skilled in the art that exemplary embodiments can be readily implemented using, for example, the processor 510 or other data or digital processing device, either alone or in combination with external support logic.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the claimed subject matter, and that the article of manufacture may comprise any information bearing medium known in the art.

The logic implementations describe specific operations as occurring in a particular order. In alternative implementations, certain of the logic operations may be performed in a different order, modified or removed and still implement preferred embodiments. Moreover, steps may be added to the above described logic and still conform to implementations of the invention.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of generating a public long code mask (PLCM) in a mobile station in a wireless mobile communication network, the method comprising:
    receiving a message in the mobile station from a base station when the mobile terminal is handed off;
    reading a first field of the message;
    reading a second field of the message if the first field comprises a first value; and
    reading a third field of the message if the second field comprises a second value, wherein the third field includes least significant bits of the PLCM; and
    generating the PLCM using the least significant bits of the PLCM,
    wherein the first field is one bit in length and the second field is four bits in length.

2. The method of claim 1, wherein the first field comprises a PLCM-type-included indicator and the second field comprises a PLCM-type indicator.

3. The method of claim 1, wherein the third field is 39 bits in length.

4. The method of claim 1, wherein the first value is '1' and the second value is '0001'.

5. The method of claim 1, wherein the message comprises a universal handoff direction message (UHDM) or a service connection message (SCM).

6. A method of generating a public long code mask (PLCM) in a mobile station in a wireless mobile communication network, the method comprising:
    receiving a message in the mobile station from a base station when the mobile terminal is handed off;
    reading a first field of the message;
    setting a first parameter of the mobile station to a value of a second field of the message if the first field comprises a first value;
    setting a second parameter of the mobile station to a value of a third field of the message if the second field comprises a second value; and
    generating the PLCM using the second parameter,
    wherein the first field is one bit in length and the second field is four bits in length.

7. The method of claim 6, wherein the first field comprises a PLCM-type-included indicator and the second field comprises a PLCM-type indicator.

8. The method of claim 6, wherein the third field is 39 bits in length.

9. The method of claim 6, wherein the first value is '1' and the second value is '0001'.

10. The method of claim 6, wherein the message comprises a universal handoff direction message (UHDM) or a service connection message (SCM).

11. A method of providing a public long code mask (PLCM) to a mobile station in a wireless mobile communication network, the method comprising:
    transmitting a message to the mobile station from a base station, the message comprising a first field including a first value, a second field including a second value, and a third field including least significant bits of the PLCM,
    wherein the least significant bits included in the third field are used to generate the PLCM,
    wherein the first value indicates that the message includes the second field and the second value indicates that the message includes the third field,
    wherein the first field is one bit in length and the second field is four bits in length.

12. The method of claim 11, wherein the first field comprises a PLCM-type-included indicator and the second field comprises a PLCM-type indicator.

13. The method of claim 11, wherein the third field is 39 bits in length.

14. The method of claim 11, wherein the first value is '1' and the second value is '0001'.

15. The method of claim 11, wherein the message comprises a universal handoff direction message (UHDM) or a service connection message (SCM).

* * * * *